United States Patent [19]

Fung et al.

[11] Patent Number: 5,220,838
[45] Date of Patent: Jun. 22, 1993

[54] OVERPRESSURE-PROTECTED, DIFFERENTIAL PRESSURE SENSOR AND METHOD OF MAKING THE SAME

[75] Inventors: Clifford D. Fung, Mansfield; Kevin H.-L. Chau, Franklin; P. Rowe Harris, East Wareham; John G. Panagou, South Attleboro; Gary A. Dahrooge, Worcester, all of Mass.

[73] Assignee: The Foxboro Company, Foxboro, Mass.

[21] Appl. No.: 676,914

[22] Filed: Mar. 28, 1991

[51] Int. Cl.$^5$ .............................. G01L 9/06
[52] U.S. Cl. .................. 73/721; 29/621.1; 73/727
[58] Field of Search ........... 73/721, 727, 754, 756, 73/DIG. 4, 706, 708; 338/4, 42; 29/621.1

[56] References Cited

U.S. PATENT DOCUMENTS

| | | | |
|---|---|---|---|
| 4,023,562 | 5/1977 | Hynecek et al. | 29/577 |
| 4,040,172 | 8/1977 | Kurtz et al. | 338/4 |
| 4,063,209 | 12/1977 | Kurtz et al. | 338/4 |
| 4,445,108 | 4/1984 | Mallon et al. | 73/721 |
| 4,528,855 | 7/1985 | Singh | 73/721 |
| 4,622,856 | 11/1986 | Binder et al. | 73/727 |
| 4,672,354 | 6/1987 | Kurtz et al. | 73/721 |
| 4,744,863 | 5/1988 | Guckel et al. | 156/653 |
| 4,773,269 | 9/1988 | Knecht et al. | 73/706 |
| 4,784,721 | 11/1988 | Holmen et al. | 29/621.1 |
| 4,790,192 | 12/1988 | Knecht et al. | 73/754 |
| 4,853,669 | 8/1989 | Guckel et al. | 338/4 |
| 5,062,302 | 11/1991 | Petersen et al. | 73/721 |

Primary Examiner—Donald O. Woodiel
Attorney, Agent, or Firm—Michael L. Sheldon; W. Hugo Liepmann; Jules Jay Morris

[57] ABSTRACT

An overpressure-protected, differential pressure sensor (37) is formed by depositing diaphragm material (24) over a cavity (23) formed and filled with sacrificial material (22) into a front surface of a substrate. The sacrificial material (22) is then removed to create a free diaphragm. The floor of the cavity (23) defines a first pressure stop to limit the deflection of the diaphragm in response to pressure applied to the top of the diaphragm. A port (33) is created to allow pressure to be applied to the bottom side of the diaphragm (24). An optional second pressure stop, which limits the deflection of the diaphragm in response to pressure applied to the bottom side of the diaphragm, is formed by bonding a cap (35) to standoffs (34) placed around the top of the diaphragm. The standoffs are spaced to allow pressure to be applied to the top of the diaphragm.

23 Claims, 10 Drawing Sheets

FIG. 16
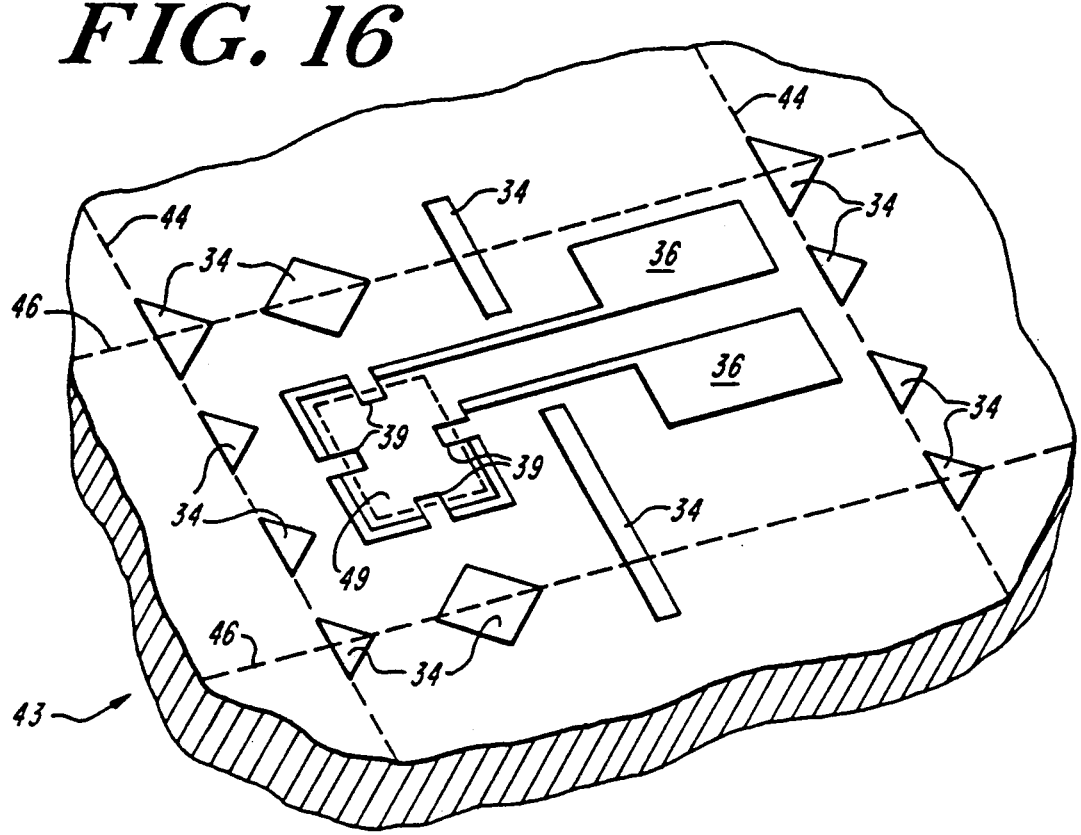
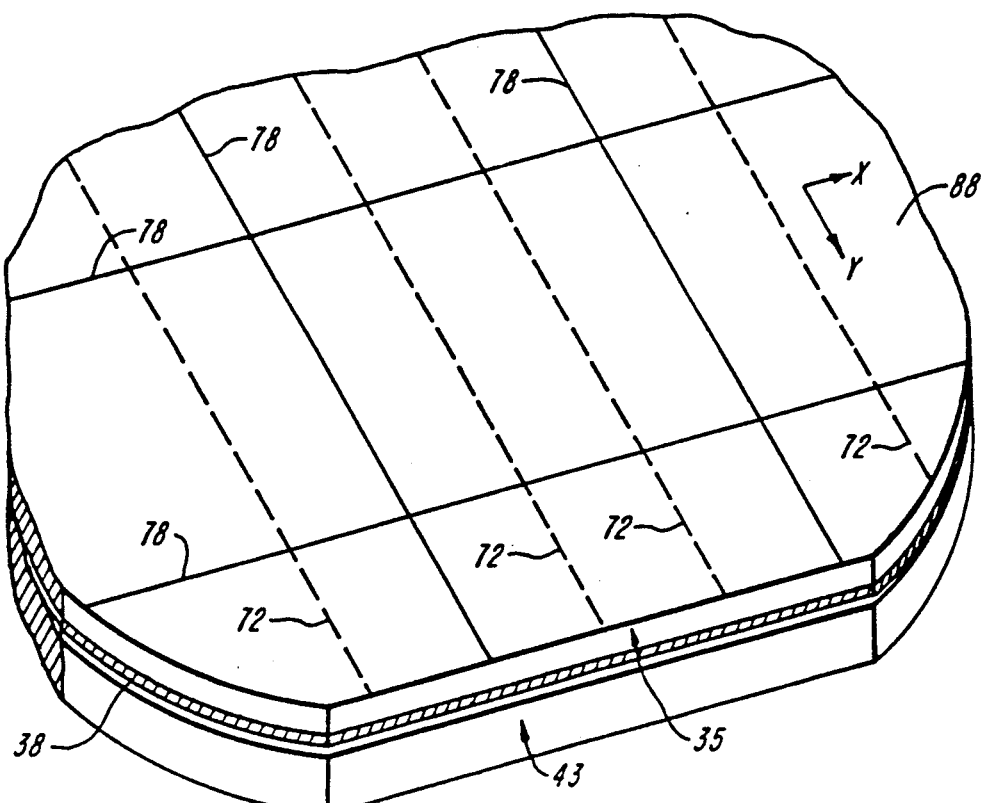
FIG. 18

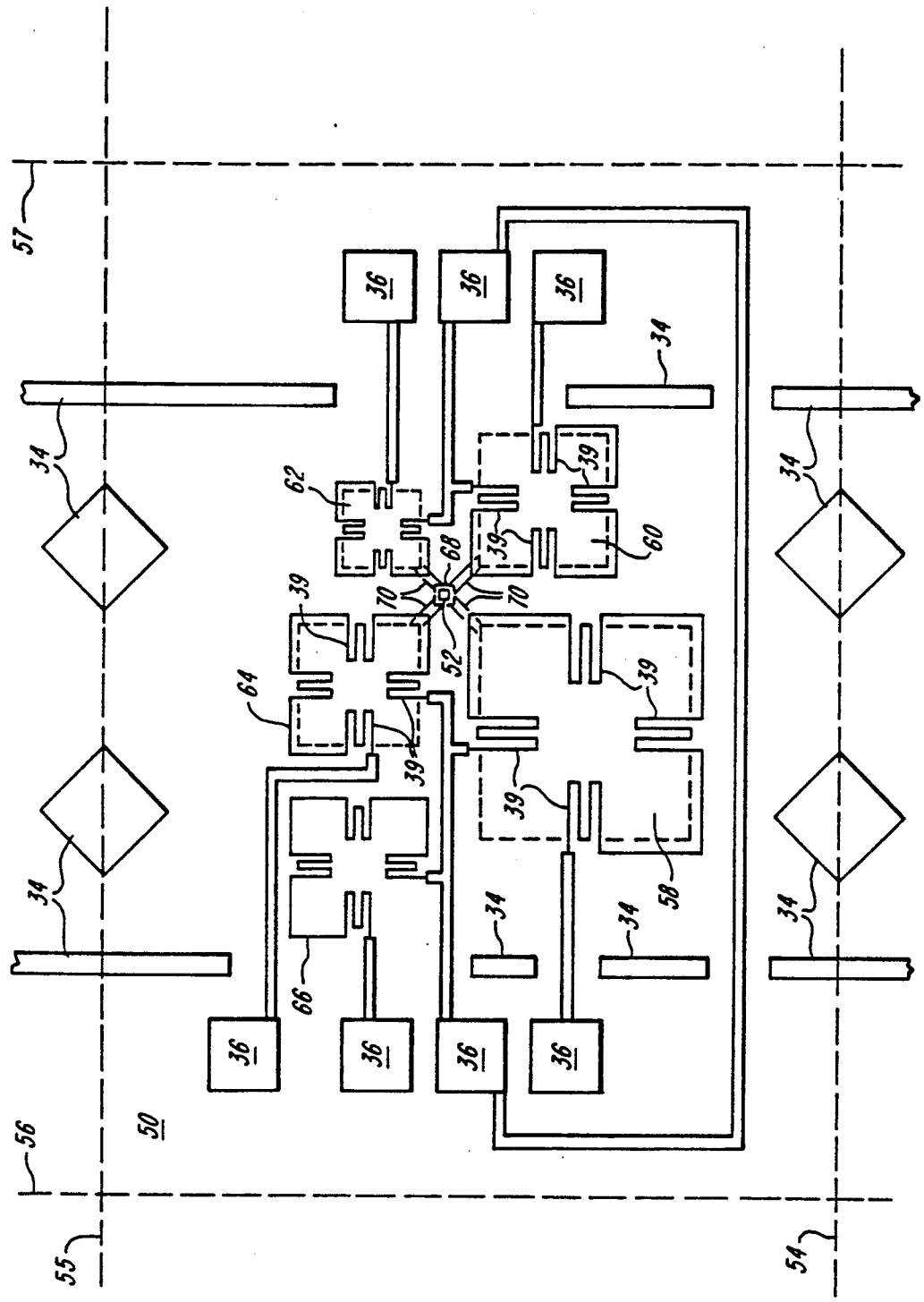

OVERPRESSURE-PROTECTED, DIFFERENTIAL PRESSURE SENSOR AND METHOD OF MAKING THE SAME

FIELD OF THE INVENTION

The present invention relates to a pressure sensor for sensing differential pressure and more particularly to an overpressure-protected sensor.

BACKGROUND OF THE INVENTION

Various single and dual direction pressure sensors are available utilizing a silicon diaphragm which deflects in response to pressure. Deflection of the diaphragm is generally detected by sensing elements such as piezoresistive elements placed on the edges of the diaphragm. These sensors are generally designed so that batch fabrication is possible. The range of pressure detection will depend on the size, thickness and span of the diaphragms.

To protect these sensors from hostile environments, the diaphragms are insulated by an isolator arrangement which uses an incompressible fluid to transfer applied pressure from a process environment to the sensing diaphragm. An overpressure protection device is provided to inhibit the isolator fluid from further transferring pressure to the sensor when the applied pressure reaches a preselected limit. For example, an overpressure protection device that isolatingly couples pressure to a pair of separated volumes of substantially incompressible isolator fluid is described in U.S. Pat. No. 4,949,581 issued to Stanley E. Rud, Jr. on Aug. 21, 1990. As disclosed in that patent, each volume of isolator fluid is in fluid communication with one side of the diaphragm. Pressure applied to the sensor is limited by two isolator diaphragms. When a preselected differential pressure limit is exceeded, the deflection of one of the isolator diaphragms (responding to the greater pressure) bottoms against an insulator diaphragm support. Once bottomed against the support, no further increases in pressure are transmitted to the sensor. The pressure limits of these devices are set to protect the sensor diaphragm which has a relatively low pressure limit from pressures which will permanently deform it and thereby degrade the sensor's performance.

One method that has been suggested in order to increase the range of sensor sensitivity and yet protect diaphragms used to measure lower ranges of differential pressures is to form a center boss on the diaphragms. When the diaphragm is exposed to excess pressure, the boss stops against a base and limits the deflection of the diaphragm before it is damaged. Such bosses are described in greater detail in the above referenced patent. A method of forming an overpressure stop boss extending from a diaphragm is similarly disclosed in U.S. Pat. No. 4,790,192 issued to Thomas A. Knecht et al.

A disadvantage of this design is that the deflections and thus sensitivity of the diaphragm can be affected by the overpressure boss. Diaphragms are generally less flexible in the areas of the boss and therefore likely to be less sensitive to pressure. In order to achieve the same pressure range, the diaphragm area would have to be larger than a diaphragm area without the center boss and thus some useful silicon real estate is wasted. Further, with extreme pressures, the unsupported portions of the diaphragm can rupture. Thus, the extended range of these pressure sensing diaphragms is limited.

An alternate design for a bi-directional pressure sensor, which cures some of the shortcomings of the design mentioned above, is disclosed in U.S. Pat. No. 4,905,575 issued to Knecht et al. on Mar. 6, 1990. According to the teachings of Knecht et al., a silicon diaphragm is mounted between two glass base plates which have recesses formed therein to receive the diaphragm and provide support across the diaphragm under overpressure conditions. The support plates serve as positive stops when the diaphragm is subject to overpressure and thus prevent overstressing the diaphragm. The pressure sensor disclosed in this patent further includes a diaphragm having grooves formed on opposite surfaces to define a center deflecting portion. The grooves provide a "free edge" effect which reduces bending stress at the diaphragm edge and permit a higher operating pressure without breakage.

Removing material to provide grooves on opposite surfaces of the diaphragm, however, requires tight control tolerances during manufacture. Precise alignment of the glass base supports during assembly is also critical, especially when the sensor has an array of sensing diaphragms with different sensing ranges. Further, glass and silicon differ in strength and thermal coefficients. When the sensor is intended for applications over wide temperature and pressure ranges, the material property mismatch can create stresses and large sensing errors which may be difficult to overcome.

SUMMARY OF THE INVENTION

It is therefore an object of the present invention to provide an improved overpressure-protected silicon chip sensor using integrated-circuit batch processing techniques.

Another object of the invention is to manufacture an array of overpressure-protected sensors having different ranges of pressure detection using integrated-circuit batch processing techniques.

A still further object of the present invention is to provide features which prevent the diaphragm from sticking to the overpressure stops after pressure is released.

It is a further object of the invention to provide flexible manufacturing and assembly tolerances to ease production of overpressure-protected sensors.

It is a further object of the invention to provide an improved and less costly method of manufacturing an array of sensors having overpressure protection means.

The present invention results from the realization that single and bi-directional, overpressure-protected sensors can be manufactured by depositing diaphragm material over spacers which are subsequently removed to form cavities in a single surface of a semiconductor substrate. For overrange pressure conditions, the uniform cavity surface serves as a pressure stop. A second pressure stop, when required, is provided by a cap positioned over the diaphragm and bonded to supportive standoffs selectively deposited about the diaphragm. It was further realized by the present inventors that a bi-directional, overpressure-protected sensor manufactured in this manner is relatively easy to manufacture because it requires wafer bonding only on one side.

In accordance with the preferred embodiment of the present invention, a bi-directional, overpressure-protected sensor is constructed by first depositing a polysilicon diaphragm layer over an oxide spacer formed in a cavity created in the surface layer of a silicon substrate. This oxide spacer will later be etched from the backside of the substrate to define a diaphragm that is free standing and unsupported over the cavity. A port is created by etching the backside of the substrate to remove the oxide spacer and provides pressure access to the underside of the diaphragm. This is hereinafter referred to as the "backside etch" approach. Alternatively, the oxide spacer can first be etched from the front side and then sealed as a vacuum cavity. The backside port can then be etched until it reaches and reopens the cavity. This approach will hereinafter be referred to as the "punch through" approach.

The surface area of the substrate forming the cavity is used as a first, or forward, overrange pressure stop to prevent damage to the diaphragm when excess pressure is applied to the top side of the diaphragm. This surface area of the cavity is preferably coated with silicon dioxide or silicon nitride to prevent the diaphragm from sticking to the pressure stop during overpressure conditions. This coating can be deposited once the backside port is etched or once the cavity is etched in the substrate. Non-sticking surfaces for the diaphragm and stops are important since in silicon sensor fabrication, surfaces are usually atomically smooth and can easily stick to one another permanently.

An advantage of forming a diaphragm over a cavity created in the surface layer of the substrate is that the cavity provides a built-in pressure stop. The diaphragm can only be deflected by a distance set by the cavity depth before reaching and being stopped by the silicon substrate. Tests conducted by the present inventors on the overrange behavior of sealed-cavity polysilicon diaphragms have demonstrated outstanding mechanical strength and reproducibility of these devices for pressure sensing. Further, when pressure ports are on opposite sides of the chip, the sensor is easier to mount and package. Manufacturing a bi-directional, overpressure-protected, differential pressure sensor in accordance with the present invention also introduces less mechanical parasitic effects than other prior art devices.

A second, or back pressure, overrange pressure stop is constructed by selectively depositing standoffs having a predetermined height around the top side of the diaphragm. The standoffs are spaced to provide support for a cap, which will serve as a second pressure stop, and to allow pressure to be applied to the top side of the diaphragm. An advantage of providing this second overrange pressure stop is that, during wafer fabrication, a large cap wafer can be easily layered onto and bonded to the top of a wafer fabricated with multiple pressure devices without concern for aligning the two wafers. Thereafter, the composite wafer can be diced into pressure sensing chips. Another advantage is that the above method for constructing this bi-directional overpressure-protected pressure sensor lends itself to a relatively inexpensive way to manufacture multiple sensing devices on a single chip having a range of pressure sensitivities.

DRAWINGS

The foregoing and other objects, features, and advantages of the invention will be apparent from the following and more particular description of the preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 16 is a perspective view of the top of a sensor module formed on a wafer and having one differential pressure cell in accordance with the present invention.

FIG. 17 is a perspective view of the top of an alternative sensor module formed on a wafer and having multiple differential pressure cells for providing a range of pressure sensing sensitivities.

FIG. 18 is a perspective view of a cap wafer bonded to a sensor wafer to form a wafer composite of bidirectional, overpressure-protected sensor modules.

DETAILED DESCRIPTION OF THE INVENTION

Figure 1:
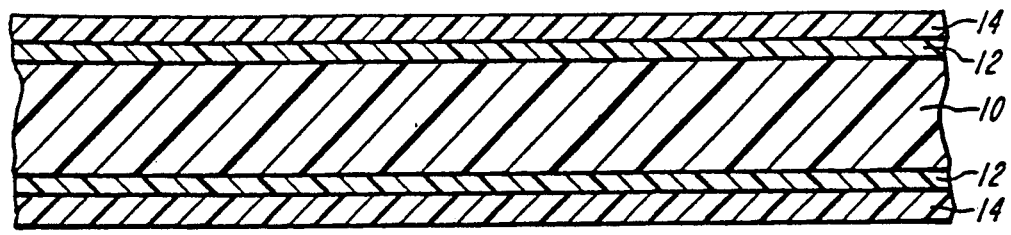
FIG. 1 is a cross-sectional view through a silicon substrate on which layers of silicon dioxide and silicon nitride have been deposited.

An overpressure-protected, differential pressure sensor 37 is formed by depositing diaphragm material 24 over a cavity 23 formed and filled with sacrificial material 22 into a front surface of a substrate. The sacrificial material 22 is then removed to create a free diaphragm. The floor of the cavity 23 defines a first, or forward, pressure stop to limit the deflection of the diaphragm in response to pressure applied to the top of the diaphragm. A port 33 is created to allow pressure to be applied to the bottom side of the diaphragm 24. An optional second or back pressure stop, which limits the deflection of the diaphragm in response to pressure applied to the bottom side of the diaphragm, is formed by bonding a cap 35 to standoffs 34 placed around the top of the diaphragm. The standoffs are spaced to allow pressure to be applied to the top of the diaphragm.

Referring now to the drawings in detail, the processing steps which may be utilized to produce single and dual direction, overpressure-protected sensors in accordance with the present invention will now be described. According to the preferred embodiment, a cavity area is defined as an oxide spacer which is grown into the substrate surface. A diaphragm layer, later deposited, will then be substantially coplanar with its supporting substrate portions. With reference to FIG. 1, the starting material comprises a crystalline silicon substrate 10. A 400 angstrom thick layer of silicon dioxide 12 is thermally grown on the top and bottom sides of the wafer. A second thin layer of low-stress low-pressure chemical vapor deposited (LPCVD) silicon nitride 14, about 900 angstroms thick, is then deposited. For example, the nitride may be deposited from a gas phase comprising a 5 to 1 or 6 to 1 ratio mixture of dichlorosilane gas and ammonia. As exemplary conditions, the ammonia gas may be provided at a flow rate of 9 milliliters per minute and the dichlorosilane at a flow rate of 54 milliliters per minute, at a pressure of approximately 150 milliTorr and a deposition temperature of 800° C.

Figure 2:
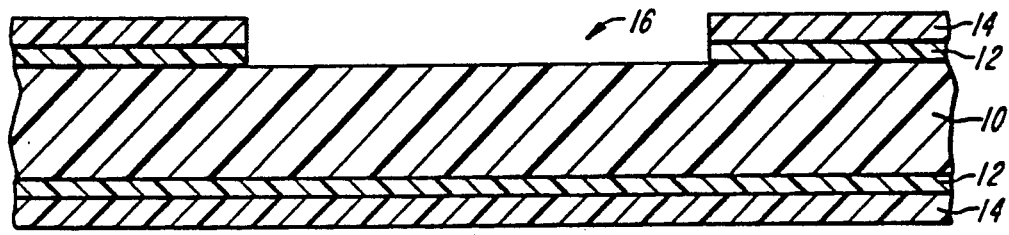
FIG. 2 is a cross-sectional view as in FIG. 1 after etching a portion of the silicon dioxide and silicon nitride to form an open area defining the perimeters of a cavity to be formed in the silicon substrate.

A layer of photoresist is now applied to the top of the wafer. Using photolithography, the photoresist is then patterned to expose the nitride 14 in the cavity area. The exposed nitride layer is etched in a $CF_4/O_2$ plasma, followed by a HF etch of the oxide layer 12 to form an open area 16 defining the perimeters of the cavity, as shown in FIG. 2. The silicon dioxide layer forms an etch stop for the nitride etchant.

Figure 3:
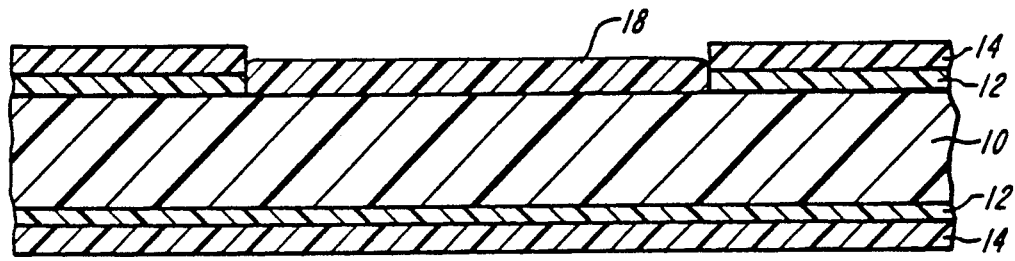
FIG. 3 is a cross-sectional view through the substrate after growing a first layer of silicon dioxide on the substrate.
Figure 4:
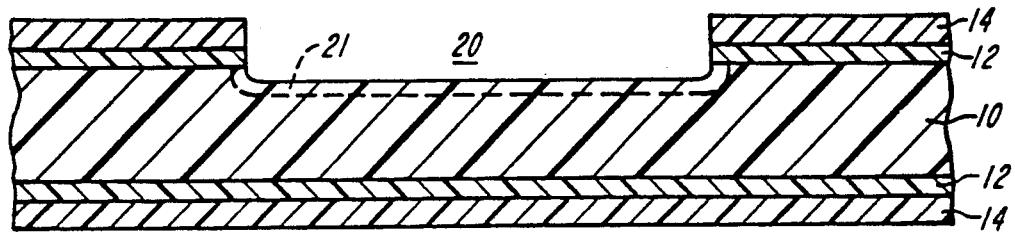
FIG. 4 is a cross-sectional view through the substrate showing a cavity in the substrate after the oxide is removed.
Figure 5:
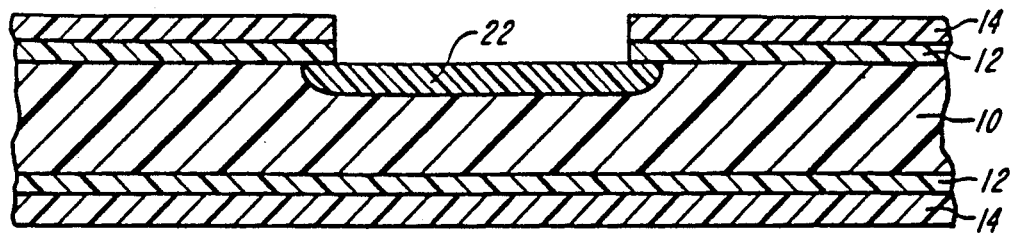
FIG. 5 is a cross-sectional view through the substrate showing the cavity of FIG. 4 filled with oxide, the top surface is level with the surface of the substrate.
Figure 6:
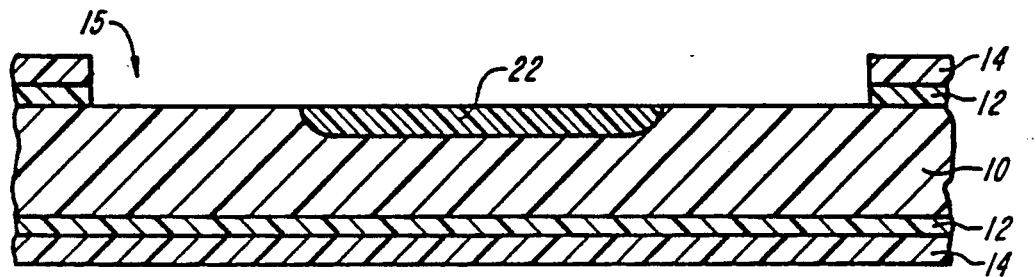
FIG. 6 is a cross-sectional view through the substrate after further etching the nitride/oxide layer to open a window for exposing the silicon substrate at places where the diaphragm is to be anchored to the substrate.

The substrate is then oxidized at, e.g., 1050° C. under wet oxygen to provide a 7500 angstrom layer 18 of silicon dioxide, as shown in FIG. 3. The entire substrate is then immersed in a HF solution to remove the oxide 18, leaving an indentation 20 in the substrate as shown in FIG. 4. In one embodiment, the surface area of the indentation left in the substrate is doped with a layer of boron 21, shown in phantom, using high concentration boron diffusion, to act as an etchant stop for a "punch through" approach that will be described in detail below. The wafer is then reoxidized under the same conditions as described above to grow a silicon dioxide spacer 22 in the indentation formed in the substrate as shown in FIG. 5. The result is an oxide filled area approximately 7500 angstroms thick, which has a top surface substantially level with the surface of the substrate. The nitride layer 14 proves to be an effective oxidation barrier, oxidizing at less that 1 angstrom a minute at a temperature of 1050° C. Using a patterned photoresist as a masking layer, the top nitride/oxide layers 14 and 12 are then etched to open a window 15, as shown in FIG. 6, which exposes the silicon substrate at places where the diaphragm is to be anchored to the substrate.

The oxide spacer can be etched from the front side of the substrate and then sealed as a vacuum cavity. The method of first creating an oxide spacer underneath a polysilicon layer for the purpose of creating a sealed-cavity sensor was first disclosed in U.S. Pat. No. 4,744,863 issued to Henry Guckel and David W. Burns on May 17, 1988. This patent is hereinafter incorporated by reference. The backside can thereafter be etched to reopen the cavity using the punch through approach. In the alternative, the oxide spacer is removed when a port is created by etching the backside of the substrate which will hereinafter be referred to as the "backside etch" approach.

Referring now to FIGS. 7-15, the punch through and backside etch approaches will now be described. For the punch through approach (depicted in FIGS. 7-11) the anchor regions and the remaining oxide/nitride regions are patterned in such a way that the oxide/nitride regions are interlaced to form a network of channels 19 leading to the diaphragm region 24a from the surrounding anchor areas 25. This channel network will allow the etchant to enter the channels and dissolve the oxide spacer 22. A more detailed description of channel placement can be found in Guckel's patent referenced above. Using the backside etch approach, which is depicted in FIGS. 12-15 there is no need for a channel network to remove the oxide spacer.

Figure 7:
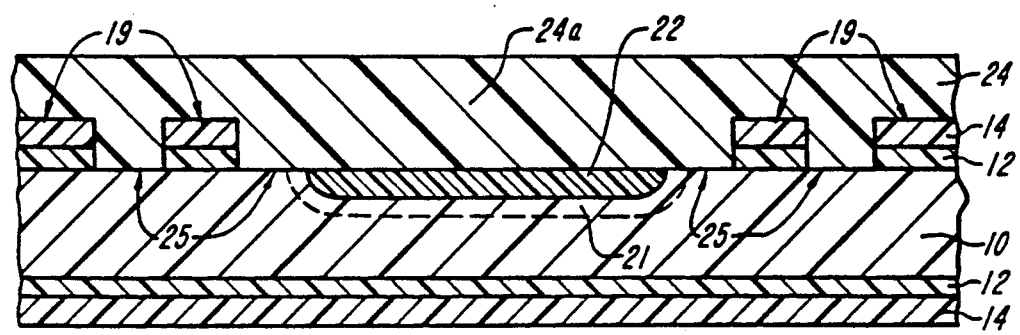
FIGS. 7-11 are cross-sectional views through a substrate illustrating process steps for forming a bidirectional, overpressure-protected sensor, in accordance with the present invention, using a punch through method for reopening a sealed-cavity diaphragm sensor.
Figure 12:
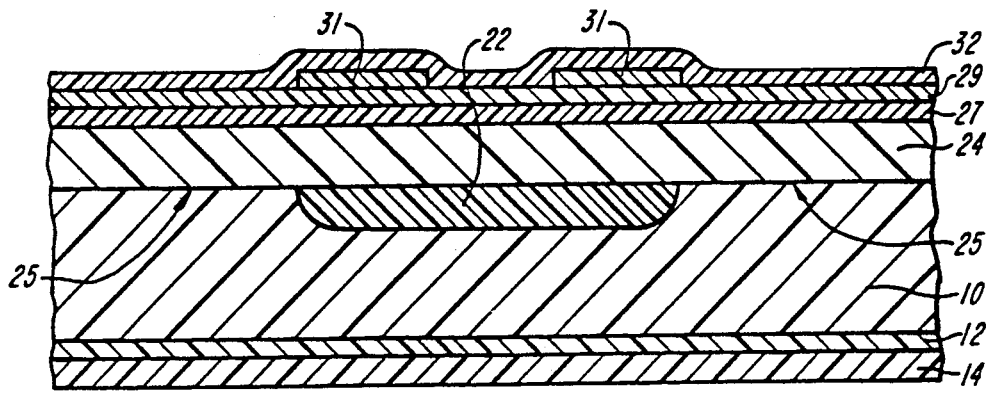
FIGS. 12-15 are cross-sectional views through a substrate illustrating alternative process steps for forming a bi-directional, overpressure-protected sensor, in accordance with the present invention, using a backside etch approach for removing a sacrificial spacer to form a diaphragm.

A layer 24 of LPCVD polysilicon (e.g. 2 micrometers thick) is then deposited on the substrate 10, with the portion of the polysilicon layer overlying the oxide spacer 22 (FIGS. 7 and 12). For example, a 2 micron thick layer of polysilicon may be deposited from silane gas at 580° C. at 300 milliTorr for 340 minutes and then annealed at 1150° C. for 3 hours to reduce the residual strain field.

The next step in the punch through approach involves the etching of the oxide spacer to form a cavity 23. Window cuts in the polysilicon layer (not shown) are first made in an area laterally displaced from the diaphragm by using plasma or reactive ion etching until it reaches the underlying nitride/oxide channel regions. The wafer is then immersed in HF etchant which would enter through the polysilicon cuts to start etching the channels and work its way to clear the oxide spacer. Typical duration of the etch is 20 hours, depending on the span of the diaphragm. Afterward, the wafer is rinsed thoroughly in water.

Figure 8:
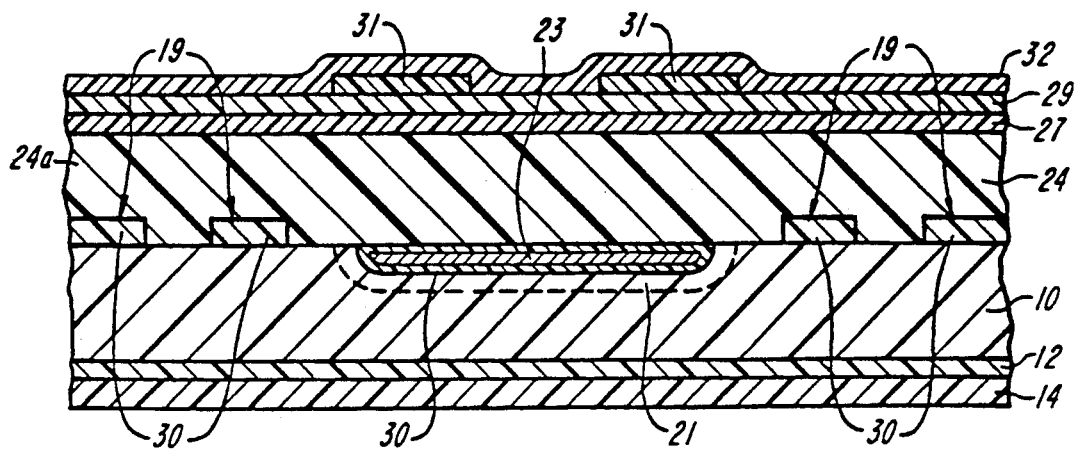

For both the punch through and the backside etch approaches, a layer 27 (FIGS. 8 and 12) of silicon dioxide, 500 angstroms thick, and a layer 29 of LPCVD silicon nitride, 900 angstroms thick, are then grown. The desired low stress nitride layer can be achieved by using larger ratios of dichlorosilane to ammonia. This serves as dielectric isolation upon which the resistors will be placed. For the punch through approach, this step also seals the open cavity 23 because the open channels, which are approximately 1400 angstroms high, will be completely plugged by the growth of an oxide/nitride layer 30 (FIG. 8). The residual reactive gases trapped inside the cavity 23 will continue to react until essentially a vacuum is left in the cavity. Furthermore, because of this coating of oxide/nitride 30 formed inside the cavity, the diaphragm will not stick to the surface area of the cavity during overpressure conditions.

Immediately after the deposition of the silicon nitride layer 29, the wafers are transferred to a LPCVD polysilicon deposition system where a layer of sensing resistor material is deposited. In the preferred embodiment four serpentine resistors 39 (as shown in FIGS. 16 and 17) are mounted symmetrically about the diaphragm center and connected in series to provide the highest pressure sensitivity and the best matching of resistors from diaphragm to diaphragm. Formation of such resistors is shown and described in the patent issued to Guckel et al. referenced above.

Generally, the resistors 39 are formed by first depositing a layer of resistor material such as polysilicon 31 (e.g., about 5000 angstroms thick) on the nitride layer 29. An ion implant of a single dopant is applied to the entire polysilicon layer. A photoresist is then applied to areas of the polysilicon layer to expose contact areas and turn-around points of the polysilicon resistors. A further implant of the same dopant is applied to these exposed areas of the layer. This allows a heavier implant dosage (and hence a lower resistance) in the contact areas and turn-around points of the polysilicon resistors. The resistors can be doped either p-type or n-type using boron or phosphorous dopants. By utilizing both types of dopants on a single diaphragm, a fully active resistor bridge on the diaphragm may be obtained. The turn-around points preferably have lower resistance so that their contribution to strain sensitivity is small.

The photoresist is then removed, and another layer of photoresist is applied to the polysilicon layer over those areas of the layer that are to be retained as resistor regions. An etchant, for example, $CF_4/O_2$ plasma, is then applied to the wafer to etch away the polysilicon in all areas except that covered by the photoresist layer. Thereafter, a layer of nitride 32 is deposited across the wafer.

The sensor wafers are now ready for opening the backside port. Note that, during the fabrication of the differential pressure sensor, all the deposition steps mentioned above may be deposited on both sides of the substrate. Here, it is important that the two previous LPCVD polysilicon layers, namely the diaphragm and resistor layers, be completely removed from the backside with plasma etching to prevent interference with the silicon etching, described below, for forming a backside port 33.

Figure 9:
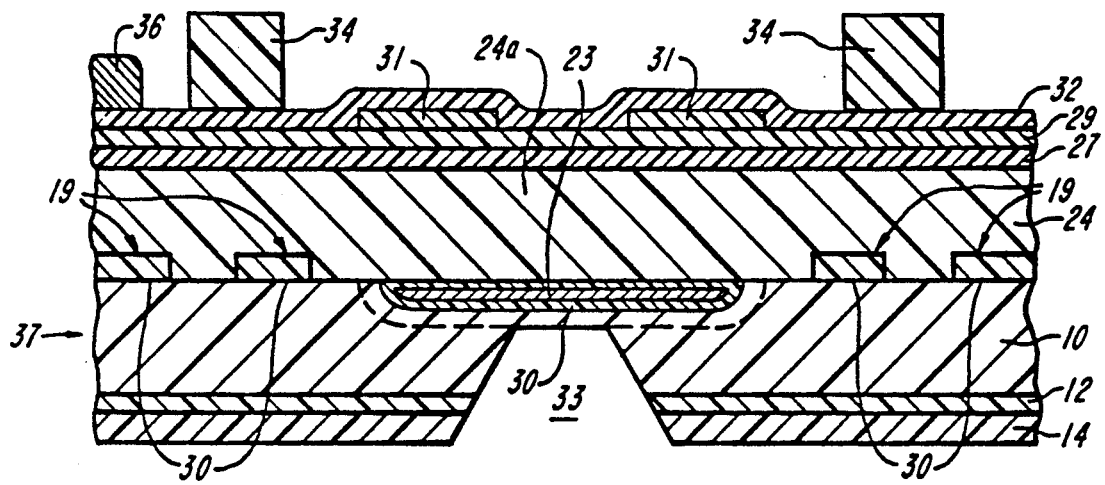
Figure 13:
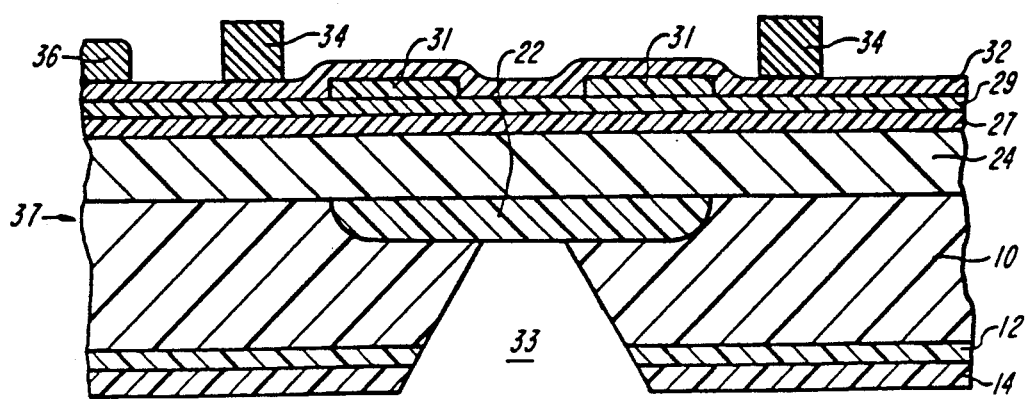

Referring now to FIGS. 9 and 13, a photoresist is first applied to the wafer backside, for defining a window area (not shown) in the oxide/nitride layers 12 and 14 for the backside port. Next, the oxide/nitride dielectric layer is etched using plasma etching and HF solution until bare silicon substrate is exposed. For both the punch through and backside etch approaches, the substrate is placed in an anisotropic etchant, e.g. KOH, to etch the exposed substrate silicon until it reaches approximately one micrometer from the cavity as shown in FIG. 9 and the bottom of the silicon dioxide spacer as shown in FIG. 13. Note that for the punch through approach (FIG. 9), the boron etch stop 21 limits the progression of the etch near the cavity floor. For the backside etch approach, the etching is almost self-stopping since the etch rate of silicon dioxide in KOH is approximately two orders of magnitude lower than the corresponding etch rate for crystalline silicon substrate. Furthermore, the front side of the wafer as well as unopened areas on the backside will not be attacked because of the presence of the protective nitride layers 14 and 32. Because of the anisotropic nature of the etch, the opened port 33 takes the final shape of a pyramid having its apex cut off at the etch stop. At this point, the wafer will be withdrawn from the etching bath and be thoroughly rinsed and cleaned.

Typical KOH etch conditions for both approaches are 50% weight of KOH in water at 90° C. For a wafer 390 micrometers thick and a backside opening starting as a 590 micrometers square on the wafer back surface, the etched silicon tapers to around 60 micrometers at the etch stop 21 or the oxide spacer 22. The total etch time is approximately 3 hours.

In some applications, high backpressures may require installation of an overrange stop on top of the diaphragm, however, it should be noted that these polysilicon diaphragms are stronger than most other silicon based diaphragms and will not crack or fail when subjected to moderate backpressure. For example, sensors similar to those shown in FIGS. 11 and 15, but without the dual overrange cap discussed below, have been tested to withstand 6,000 psi of forward pressure and 145 psi of back pressure with 2 micron diaphragms. If dual overrange protection is required, standoffs 34 are next formed in strategic locations surrounding the diaphragm for supporting a cap 35 (FIGS. 10 and 14), which will serve as a second pressure stop. The standoffs are placed around the diaphragm to allow pressure to be applied to the top side of the diaphragm. (Also see FIGS. 16 and 17.) A detailed description of the cap and location of the standoffs will be described in greater detail below.

In the preferred embodiment, the standoffs are formed by depositing LPCVD polysilicon with 100% silane at 580° C. and at 300 milliTorr. Following deposition, a photoresist is applied to protect those areas to be retained as standoffs and the unprotected polysilicon layer is then completely removed by plasma or reactive ion etching. The underlying nitride layer 32 will be an etch stop for this process. The polysilicon layer forming the standoffs 34 must be sufficiently thick so that the tops of the standoffs 34 are uniformly the same height and the highest surface on the wafer. This height will define the maximum travel of the deflecting diaphragm. Since different travel distances will result in different degrees of overpressure protection, the actual thickness of the polysilicon will vary according to the application of the sensor. A typical value is about one micrometer. Note that the length and width of the standoffs are important for supporting the cap. The standoffs should also be spaced from each other to allow pressure to be applied to the top side of the diaphragm.

Metalized electrical contact pads 36 for interconnecting the heavily doped portions of the polysilicon resistor layer and for providing external electrical connections can now be formed. A method for forming these pads is described in detail in the Guckel patent referenced above and can be followed here. Generally, a photoresist layer (not shown) is first applied to and patterned on the top of the wafer leaving areas of the top nitride layer exposed where the contacts are to be formed. An etchant is then applied to the wafer to etch through that portion of the nitride layer to expose the polysilicon resistor layer. The photoresist is then removed, and a high temperature metal system (e.g., aluminum/titanium-nitride/ titanium) is deposited over the exposed surface, including portions (not shown) where the metal makes contact with the heavily doped portions of the polysilicon layer at the contact regions.

The surface of the metal is then patterned with a photoresist layer and an etchant applied to etch away the metal layer not covered by the photoresist. The photoresist is thereafter removed to leave the sensor structure with the metalized conduction layers in the proper pattern. The metal/polysilicon contacts will be annealed during the wafer bonding step. (See FIGS. 16 and 17 which show metalized patterns for both a single differential pressure cell and an array of differential pressure cells.)

Figure 10:
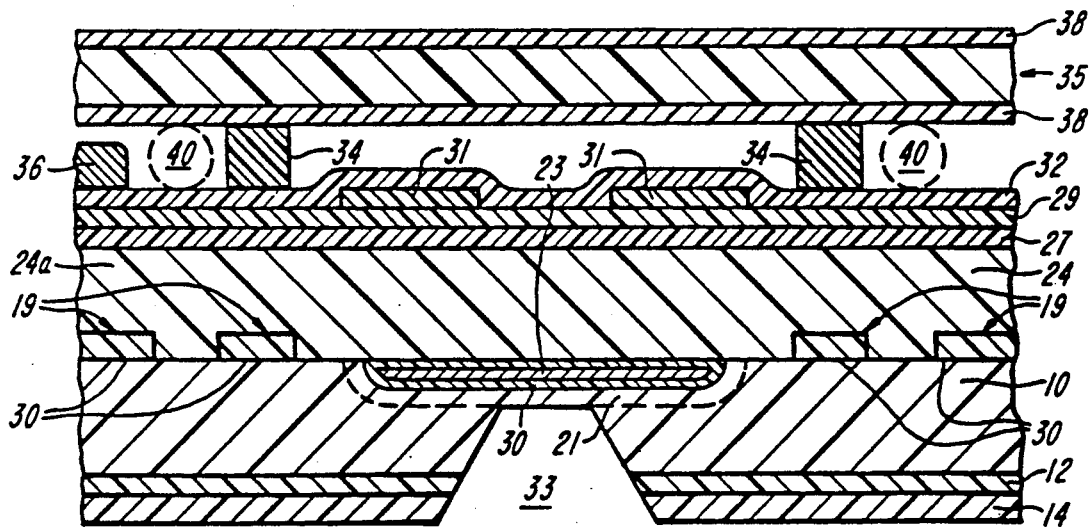
Figure 14:
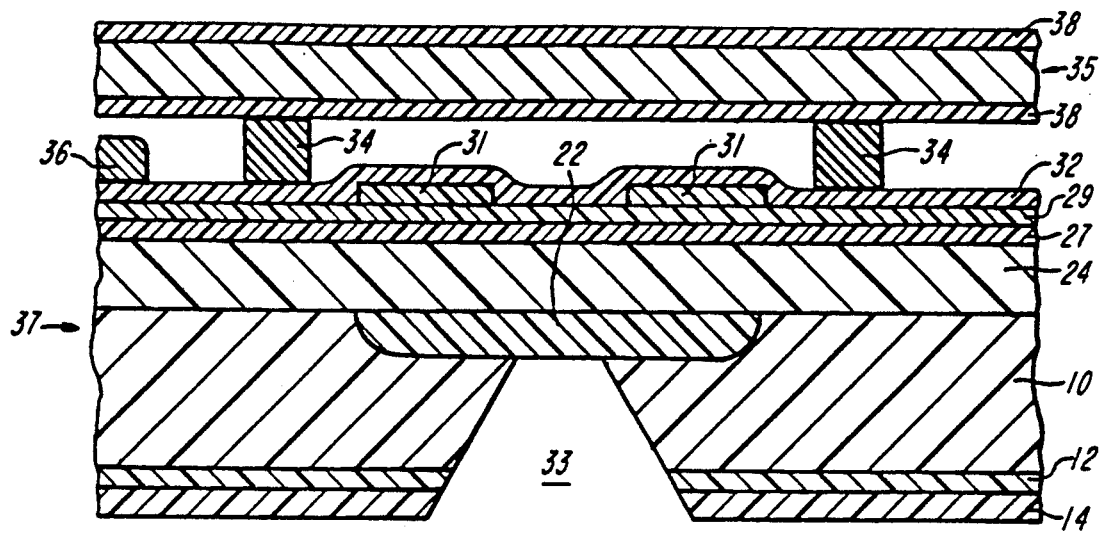

Referring now to FIGS. 10 and 14 a constructed sensor 37 is ready for bonding a wafer cap 35 to the standoffs 34. The cap will serve as a second overrange pressure stop. Note that this second overrange pressure stop is not always needed for measurement of differential pressures. A preferred bonding approach uses a boron-doped oxide ($B_2O_3$) as a bonding agent. A one micrometer thick layer 38 of silicon dioxide is first grown on the silicon cap 35 which is approximately 390 micrometers thick. Next, the oxidized cap wafer is doped with boron in a diffusion furnace at 1075° C. in a wet ambient for three hours. Immediately after deposition, the wafer cap 35 and the sensor 37 are brought together. The composite wafer is then heated to 550° C. in an inert ambient which causes the boron-doped oxide to reflow. A strong bond between the cap wafer and the polysilicon standoffs on the sensor results. No alignment between the sensor and cap is required.

A wide variety of bonding agents other than boron-doped oxide is also acceptable. For example, low temperature spin-on-glass (and, in particular, photoresist patternable spin-on-glass) flows at temperatures between 500° and 600° C. A layer of spin-on-glass can be applied onto the nitride layer 32 and patterned to form glass bumps 40 (shown in phantom in FIG. 10) away from the standoffs and active diaphragm areas. These glass bumps 40 are initially slightly higher than the standoffs. When the cap 35 and sensor 37 are pressed together at 550° C., the glass reflows and spreads out, forming a strong bond. Another preferred bonding method is the use of metal to silicon bonds. For example, a layer of aluminum film (on the order of a few tenths of micrometers) can be vacuum deposited onto the surface of the sensor wafer and photo patterned to leave aluminum on top of the standoffs. When the cap and sensor wafers are pressed together and heated, at a temperature around 600° to 650° C. in vacuum, the aluminum will alloy with the cap wafer to form a tight bond. Other bonding agents are possible. For example, anodic glass-to-silicon bonds, bonding using polymeric adhesives, as well as many others may be used.

Figure 11:
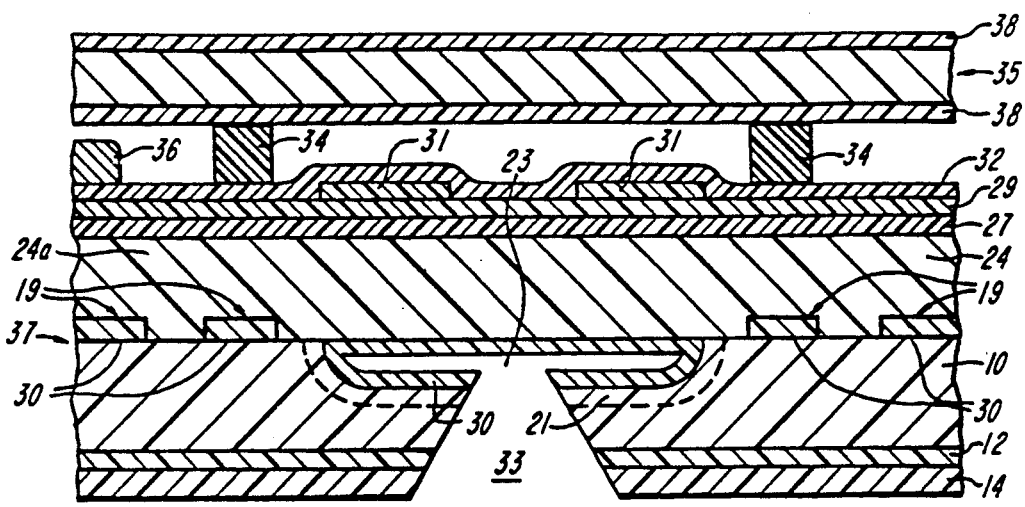

Upon completion of wafer bonding, the next step of processing depends on the approach used in etching the diaphragm cavity. For the punch through approach, the backside of the bonded sensor wafer is etched with reactive ion etch to punch through the boron doped film 21 of substrate silicon and the oxide/nitride layer 30 blocking the opening of the backside port to the vacuum-sealed cavity 23 as shown in FIG. 11. Since reactive ion etching does not etch significantly in the lateral direction, no damage to the diaphragm cavity outside the immediate area of the opening port 33 will result.

Figure 15:
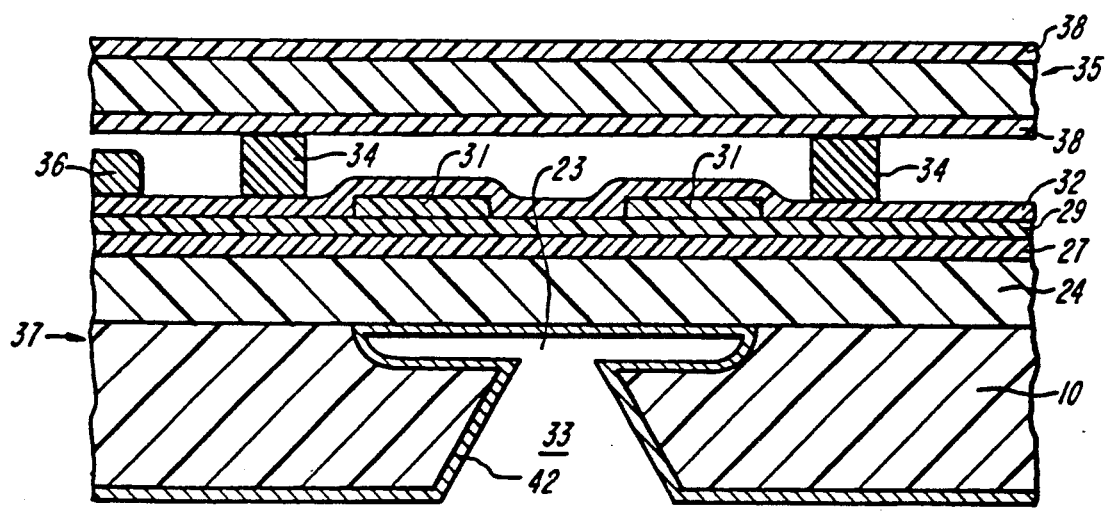

For the backside etch approach, the composite wafer is immersed in HF solution to remove the oxide spacer 22 to open cavity 23 and thus free the diaphragm. The duration of the etch depends on the size of the diaphragm and the way it branches out from the backside port 33. A typical etch time is approximately 48 hours. To protect the top of the sensor 37 from being attacked by the HF etchant, a protective material, e.g. wax, is applied to seal around the edge of the composite wafer. After the etch, the composite is immersed in a warm concentrated nitric acid to grow a native oxide coating 42 inside the port 33 and the cavity 23 walls (FIG. 15). This coating prevents the diaphragm from sticking to the walls of the cavity during overpressure conditions. Finally, the wax is stripped with solvents.

FIGS. 11 and 15 show completed dual overrange protected sensors 41. If only one-sided overrange protection is required, elements 34, 35 and 38 are deleted.

The above described integrated circuit batch processing techniques can be applied to wafer fabrication of single or bi-directional, overpressure-protected sensors having a single differential pressure cell or an array of differential pressure cells for providing a wide range of pressure detection. By fabricating an array of over-pressure-protected sensors on a single wafer, manufacturing costs can be significantly reduced because it only requires wafer bonding on one side. For example, FIG.s 16 and 17 show two possible sensor modules that can be fabricated in an array on a single wafer.

Referring now to FIG. 16, an array of single differential pressure cells can be formed on a sensor wafer 43 in accordance with the present invention as shown. Broken lines 44 and 46 are shown to indicate the borders of a single module 48 and where the wafer will be cut once the fabrication is completed. Note that when bi-directional overrange protection is required, standoffs 34 are placed around a diaphragm 49, shown by broken lines, to support a wafer cap (not shown). The metalized pads 36 which are connected to the ends of a serpentine resistor 39 will be exposed for external electrical connection.

A possible layout of a module 50 fabricated on a sensor wafer 43 having an array of differential pressure cells is shown in FIG. 17. Each cavity of an array of differential pressure cells can have its own back opening or they can share a common opening. The module shown employs a common back opening 52 for the array of differential pressure cells and will be discussed in greater detail below. Note that this opening is only shown for clarity of the present discussion and would otherwise not be apparent to someone viewing the sensor wafer 43 from the top plan view. The outline of the module 50 is shown in broken lines 54, 55, 56 and 57, and generally indicates where wafer 43 will be cut for separating the individual sensor module. Four differential pressure cells 58, 60, 62 and 64 are fabricated between two rows of electrical pads 36. Standoffs 34 have been strategically placed on the sensor wafer 43 to economize the number of supports needed to support a wafer cap that will cover the differential pressure cells of each module and provide dual overrange protection. Note that, although the number and location of the standoffs can vary, they are placed between the two columns of metalized pads 36 which will be exposed for electrical connection.

In this particular layout, the span of the four diaphragms (shown in phantom) for each differential pressure cell vary in size from approximately 120 to 320 micrometers square corresponding to a full-scale pressure sensor having a range from 50 to 1 psid, respectively. Serpentine resistors 39 are mounted symmetrically about the center of each of the diaphragms and are serially connected to metalized pads 36 as shown. A fifth serpentine resistor 66 has been included to provide a reference resistor and temperature element. Other module configurations are also possible. For example, the module can contain an array of differently sized vacuum-sealed cavity devices to measure the absolute value of the static pressure and/or pairs of differently sized differential pressure cells for providing a measurement validation scheme. Unported diaphragms can also be provided for calibration and measurement validation. The size of the module shown in FIG. 17 is approximately 1.0 by 1.8 millimeters.

The common back opening port 52 used to interconnect the cavity of each of the differential pressure cells, includes a small cavity or Plenum 68 (shown in phantom) formed in the silicon substrate having channels 70 (also shown in phantom) radially extending from the cavity 68 to each of the larger cavities of the differential pressure cells. The small cavity 68 is formed in the substrate at the same time as the cavities for the differential pressure cells are created using the same methods described. The preferred size of this cavity is about 120 micrometers square. Channels, extending radially to each of the other larger cavities, are formed by properly masking the nitride/oxide layers during the process of forming the cavities. The preferred size of these channels is 0.75 micrometers in depth and approximately 35 micrometers in width. These channels are filled with the same sacrificial oxide which is removed at the same time the oxide in the cavities is removed.

Figure 19:
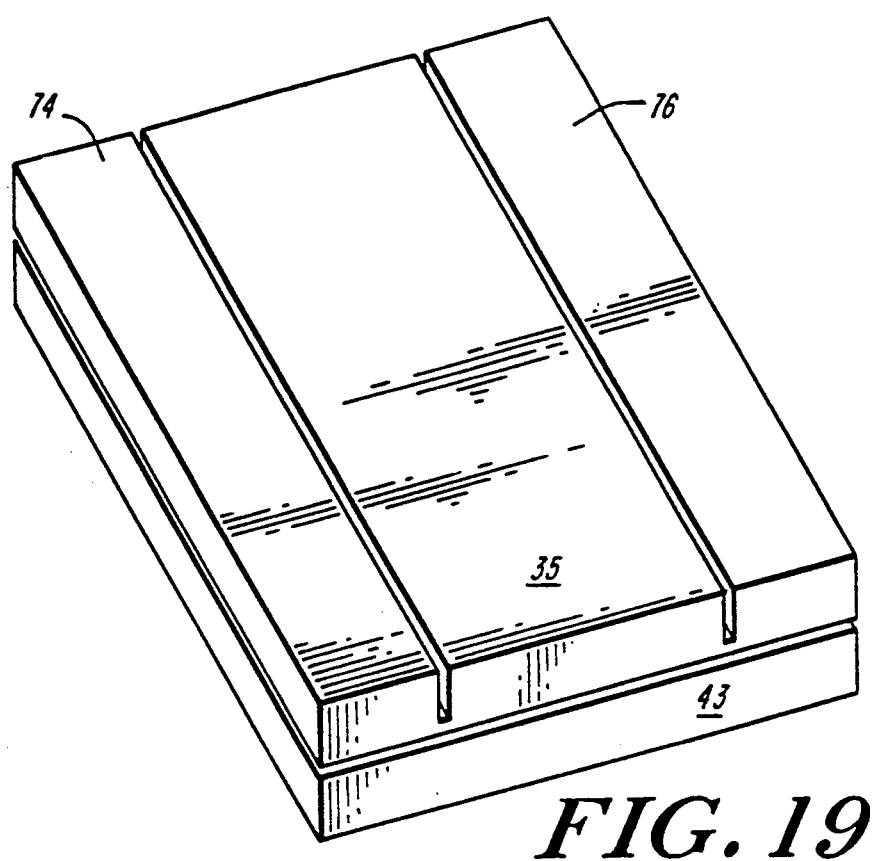
FIG. 19 is a perspective view of a bi-directional, overpressure-protected sensor module showing tabs to be broken off to expose metalized pads for external connection.
Figure 20:
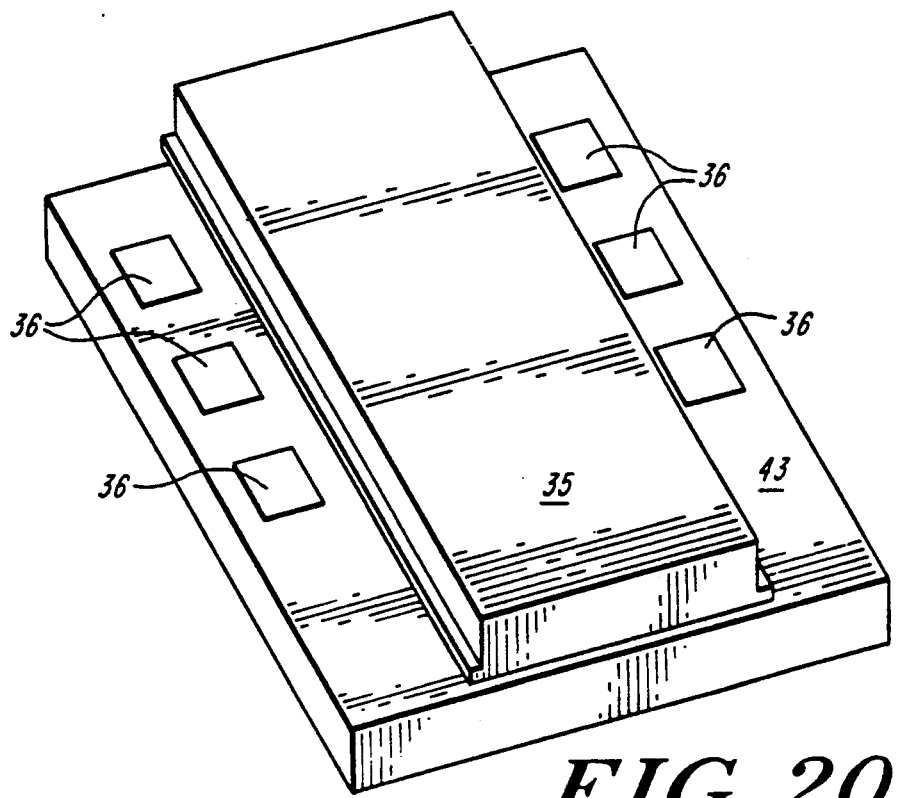
FIG. 20 is a perspective view of the bi-directional, overpressure-protected sensor module of FIG. 19 once the tabs have been removed.

Sensor wafer 43 is essentially complete and provides an array of overrange protected sensors. If dual overrange protection is required, then cap 35 is assembled to standoffs 34. Once the cap wafer 35 has been bonded to the standoffs 34 using the methods described above, the composite wafer is then ready for dicing into individual chips (FIG. 18). To accomplish this, the wafer cap is scribed in the Y direction as indicated by broken lines 72 to cut approximately 80% through the wafer cap. The placement of this cut is such that tabs 74 and 76 (FIG. 19) are created to overhang the metalized pads 36 of the module when the composite wafer 88 is diced in the x and y direction as indicated by the solid lines 78. The tabs 74 and 76 are then broken off by mechanically bending and breaking them free to expose the electrical pads (FIG. 20) to complete the fabrication process. The module is now ready for testing.

Figure 21:
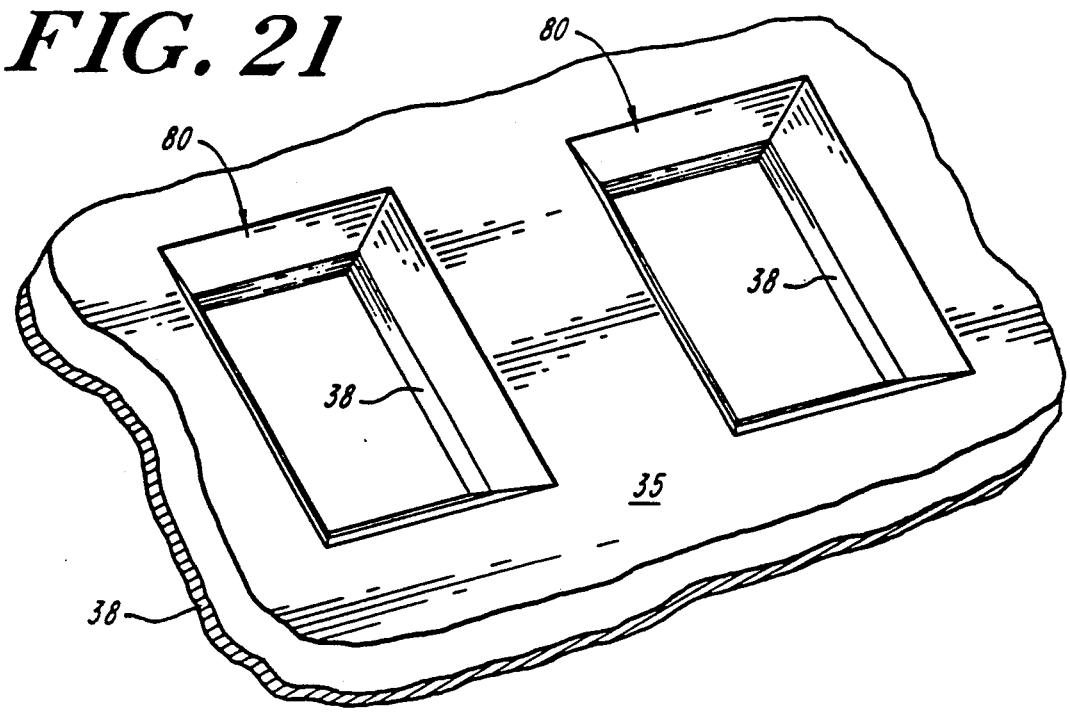
FIG. 21 is a perspective view of an embodiment of a cap wafer having holes formed through the wafer before it is bonded to a sensor wafer to expose metalized pads on the sensor wafer.
Figure 23:
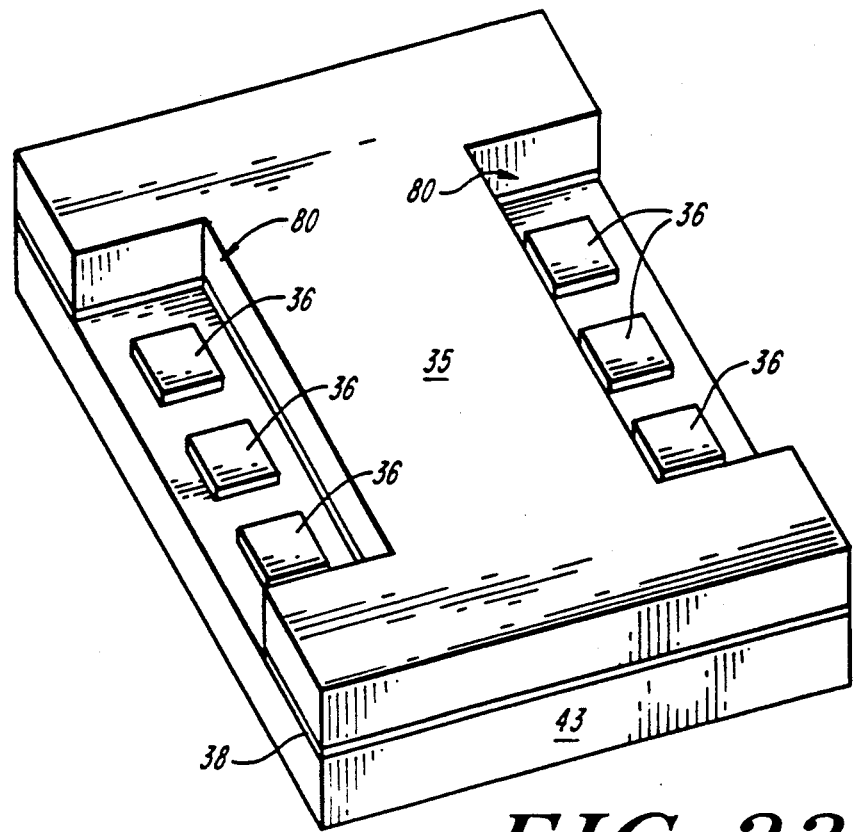
FIG. 23 is a perspective view of a resulting bidirectional, overpressure-protected sensor module when the composite of FIG. 22 is diced into individual modules.
Figure 22:
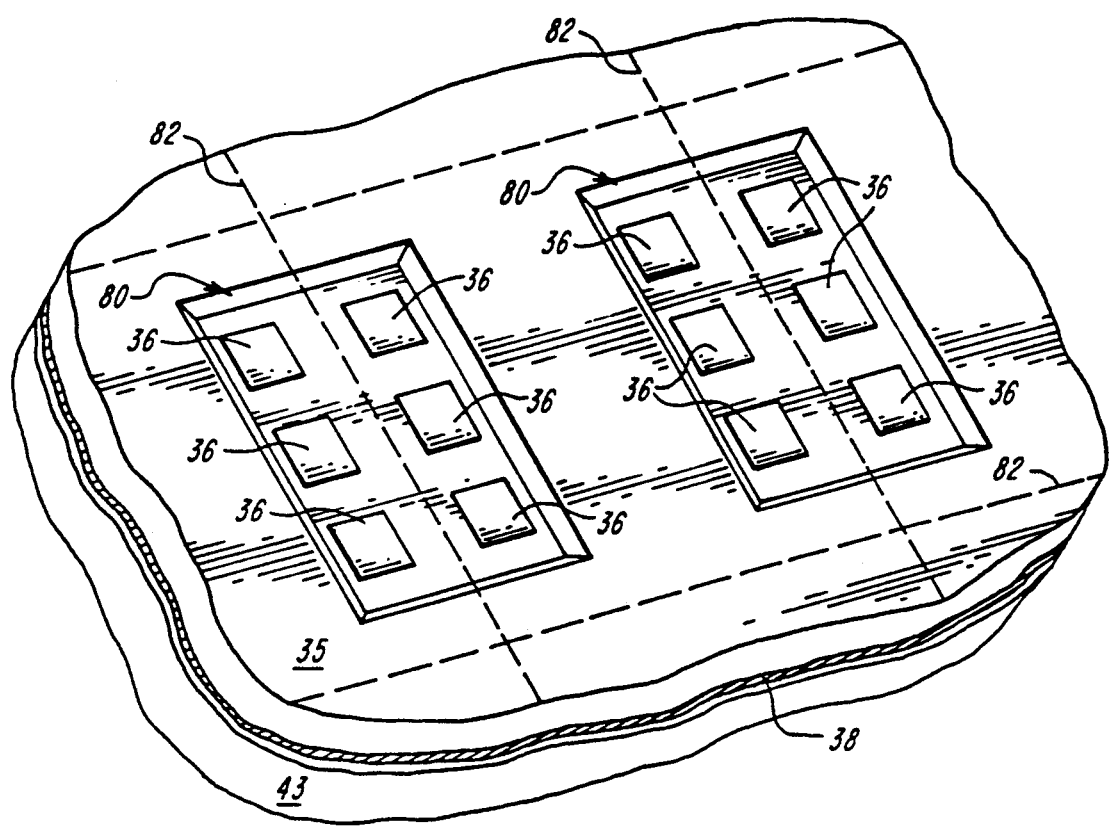
FIG. 22 is a perspective view of a composite wafer formed by bonding the cap wafer shown in FIG. 21 and a sensor wafer.

While the invention has been particularly shown and described with reference to preferred embodiments thereof, it will be understood by those skilled in the art that various changes in form and details may be made therein without departing from the spirit and scope of the invention, referring to FIG. 21, holes 80 can be cut in the cap wafer 35 before it is bonded to the standoffs 34 formed on the sensor wafer 43. When the cap wafer is bonded to the standoffs, the holes are aligned to the sensor wafer so that the metalized pads 36 of the modules are exposed as shown in FIG. 22. The composite wafer can thereafter be cut in the x and y-direction as indicated by the solid lines 82 to dice the wafer into individual modules. A resulting module is shown in FIG. 23.

Further, both pressure ports can be manufactured on the front side of the substrate. In this case, at least two diaphragms communicate by an interconnecting channel. One of the diaphragms will then be punched opened by a dry etching technique and serve as a pressure port. This port is then isolated for applying pressure from one source to the inside cavity while exposing the front side of the other diaphragm to another pressure source.

We claim:
1. A differential pressure sensor comprising:
    a silicon substrate having a cavity formed into a top surface of said substrate, wherein the floor of the cavity defines a forward pressure stop;
    a deformable diaphragm formed of polysilicon material deposited over and spanning the cavity, wherein the deflection of the diaphragm in response to pressure applied to the top side of the diaphragm is limited by the forward pressure stop;
    means for applying a first fluid pressure to the underside of the diaphragm; and
    means for applying a second fluid pressure to the top side of the diaphragm; and
    electrical means for detecting the relative deflection of the diaphragm due to a pressure differential between said first and said second fluid pressure exerted across the diaphragm.
2. The differential pressure sensor of claim further comprising:
    standoffs placed about the diaphragm to support a back pressure stop;
    a cap placed on said standoffs and over the diaphragm to define the back pressure stop for limiting the deflection of the diaphragm in response to pressure applied to the underside of the diaphragm.
3. The differential pressure sensor of claim 1 wherein said means for applying pressure includes a port formed by etching the back surface of the substrate.
4. The differential pressure sensor of claim 1 wherein the floor of the cavity is coated with material that prevents said diaphragm from sticking to the floor of the cavity during overpressure conditions.
5. The differential pressure sensor of claim 4 wherein said coating material is a nitride coating.
6. A differential pressure sensor comprising:
    a silicon substrate having a cavity formed into a top surface of said substrate, wherein the floor of the cavity defines a first pressure stop;
    a deformable diaphragm deposited over the cavity, wherein the deflection of the diaphragm in response to pressure applied to the top side of the diaphragm is limited by the first pressure stop;
    standoffs placed about the diaphragm to support a second pressure stop;
    a cap placed on said standoffs and over the diaphragm to define the second pressure stop for limiting the deflection of the diaphragm in response to pressure applied to the underside of the diaphragm;
    means for applying pressure to the top surface of the diaphragm;
    means for applying pressure to the underside of the diaphragm; and
    electrical means for detecting the relative deflection of the diaphragm due to a pressure differential across the diaphragm.
7. The differential pressure sensor of claim 6 wherein said means for applying pressure includes a port formed by etching the back surface of the substrate.
8. The differential pressure sensor of claim 6 wherein the floor of the cavity is coated with material that prevents said diaphragm from sticking to the floor of the cavity during overpressure conditions.
9. The differential pressure sensor of claim 8 wherein said coating material is an oxide coating.
10. The differential pressure sensor of claim 8 wherein said coating material is a nitride coating.
11. The differential pressure sensor of claim 6 wherein the cap is coated with material that prevents the diaphragm from, sticking to the cap during overpressure conditions.

12. The differential pressure sensor of claim 6 wherein the cap is bonded against said standoffs using boron-doped oxide as a bonding agent.

13. The differential pressure sensor of claim 6 wherein the cap is bonded against said standoffs using spin-on-glass as a bonding agent.

14. The differential pressure sensor of claim 6 wherein the cap is bonded against said standoffs using metal to silicon bonds.

15. A method of producing an overpressure-protected differential sensor comprising the steps of:
   forming a cavity in a top surface of a substrate, wherein said cavity has a preselected depth and shape to define a forward pressure stop;
   filing the cavity with s acarificial spacer material;
   depositing a layer of deformable diaphragm material over the top surface of the substrate and sacrificial material;
   removing substrate material to provide a port for removing said sacrificial spacer material and for applying back pressure to the underside of said diaphragm material; and
   removing said sacrificial spacer material from the cavity so that the cavity forms said forward pressure stop for limiting deflection of said diaphragm material when pressure applied to the top surface thereof greatly exceeds pressure applied to said port.

16. The method of producing an overpressure-protected, differential sensor as claimed in claim 15 further including the step of depositing material in the cavity to prevent the diaphragm from sticking to the floor of the cavity during overpressure conditions.

17. The method of producing an overpressure-protected, differential sensor as claimed in claim 15 further comprising the steps of:
   depositing standoffs on the top surface of the substrate about the cavity for supporting a back pressure stop;
   bonding a cap against the standoffs, wherein the cap defines the back pressure stop;

18. A method of producing a bi-directional, overpressure-protected differential sensor comprising the steps of:
   forming a cavity in a top surface of a substrate, wherein the cavity has preselected depth and shape to define a forward pressure stop;
   filling the cavity with a sacrificial spacer material;
   depositing a layer of deformable diaphragm material over the top surface of the substrate and sacrificial material;
   depositing standoffs on the top surface of the substrate about the cavity for supporting a back pressure stop;
   bonding a cap against the standoffs, wherein the cap extends over the diaphragm material and defines the back pressure stop;
   removing substrate material to provide a port for removing said sacrificial spacer material; and
   removing said sacrificial spacer material from the cavity leaving the diaphragm material suspended over the cavity to bidirectionally deflect in response to differences between pressure applied to said cavity and pressure applied between said cap and the diaphragm material....

19. The method of producing a bi-directional, overpressure-protected, differential sensor as claimed in claim 18 wherein the cap is bonded against the standoffs using spin-on-glass as a bonding agent.

20. The method of producing a bi-directional, overpressure-protected, differential sensor as claimed in claim 18 wherein the cap is bonded against the standoffs using boron-doped oxide as a bonding agent.

21. The method of producing a bi-directional, overpressure-protected, differential sensor as claimed in claim 18 wherein the cap is bonded against the standoffs using silicon to metal bonding.

22. The method of producing a bi-directional, overpressure-protected, differential sensor as claimed in claim 18 wherein the cap is coated with material to prevent the diaphragm from sticking to the cap during overpressure conditions.

23. The method of producing a bi-directional, overpressure-protected, differential sensor as claimed in claim 44 further including the step of depositing material in the cavity to prevent the diaphragm from sticking to the floor of the cavity during overpressure conditions.

* * * * *